UNIVERSAL EXTRACTOR TOOL

Filed Jan. 10, 1968

INVENTOR.
SHERMAN G. ASKREN
H. H. Losche
Paul S. Collignon
Attorneys

United States Patent Office 3,484,129
Patented Dec. 16, 1969

3,484,129

UNIVERSAL EXTRACTOR TOOL

Sherman G. Askren, 4627 E. 34th Place, Indianapolis, Ind. 46226

Filed Jan. 10, 1968, Ser. No. 696,734
Int. Cl. H05k 7/10, 7/14, 13/04
U.S. Cl. 294—15 2 Claims

ABSTRACT OF THE DISCLOSURE

A universal extractor tool having first and second U-shaped members attached together for relatively slidable movement in one direction and having spring means biasing said U-shaped members apart. A puller plate is removably attached to one of said U-shaped members and means are provided on said puller plate for engaging a module board to be extracted from a module mounting frame.

The invention described herein may be manufactured and used by or for the Government of the United States of America for governmental purposes without the payment of any royalties thereon or therefor.

BACKGROUND OF THE INVENTION

The present invention relates to an extracting tool for removing a plug-in module board from a module mounting frame.

There is a constant demand for smaller electrical and electronic components, particularly in the aircraft and missile fields, as weight is of extreme importance. One concept of microelectronics which has been recently developed and which offers a great reduction in size and weight of electronic units is that of integrated circuitry which is formed on insulated bases such as glass, fused silica, or ceramic substrates. Integrated circuitry includes a number of active and passive components which are fabricated by one or more of a combination of several thin film deposition techniques onto a glass or ceramic substrate.

In order to reduce costs, expedite production, and provide a reliable electronic component, the Department of the Navy, as well as other military branches, have been engaged in a standard hardware program in which electronic plug-in modules have been developed which are capable of meeting various system requirements. Generally, a plug-in module is designed for high reliability and, whenever possible, have a cost which will permit them to be thrown away rather than be repaired. One such plug-in module is shown in U.S. Patent 3,243,660, entitled "Electronic Module Assembly," which issued Mar. 29, 1966, to Leonard J. Yuska and David P. Zimmerman.

One concept of a standard hardware program is to have a plurality of modules which plug-in a chassis to form an assembly and normally these plug-in modules slide in grooves or ways in the chassis and engage a mating female connector. As the basic module connector consists of forty metal bayonet pins, removal of a plug-in module from a chassis normally presents a problem, as any lateral movement could damage the small bayonet pins.

Various pulling tools or extractors have been devised to facilitate the removal of a plug-in module from a chassis, and these tools are designed so that an operator can withdraw the module with controlled force. One such device which has been developed for the Navy hardware program is shown in U.S. Patent 3,180,670, entitled "Chassis Pulling Tool," which issued Apr. 27, 1965, to Thomas R. Pryde. In this chassis pulling tool, first and second U-shaped members are provided, with the legs of an inner U-shaped member being slidably mounted through holes in an outer U-shaped member. The legs of the inner U-shaped member are constructed and arranged so as to engage a plug-in module which is to be removed from a chassis.

While the chassis pulling tool of the above-mentioned patent permits an operator to easily withdraw a plug-in module from a chassis with a controlled force, the chassis pulling tool is lacking in universal application and will operate with only one specific design. Accordingly, a multiple number of complete pulling tools are frequently required by various military units which are responsible for the maintenance of electronic equipment.

SUMMARY OF THE INVENTION

The present invention relates to an extractor tool for removing plug-in modules with a controlled force. First and second U-shaped members are provided, each having a crossbar and first and second parallel legs. The size of the second U-shaped member is such that it fits within the first U-shaped member which is provided with at least one elongated slot in each leg. At least one pin is provided in each leg of the second U-shaped member and each pin extends into one of the slots in the first U-shaped member. A spring is provided between the two crossbars to provide a bias between the two U-shaped members, however, the length of the elongated slots determine the amount of slidable travel between the two U-shaped members. A puller plate is threadedly attached to the second U-shaped member and a pair of pins are attached to the puller plate for engaging a plug-in module. A variety of sizes and shapes of the puller plate can be provided to make the device a universal tool.

It is therefore a general object of the present invention to provide a universal extractor tool for removing a plug-in module from a module assembly.

Other objects and advantages of the present invention will be readily appreciated as the same becomes better understood by reference to the following detailed description when considered in connection with the accompanying drawing.

DESCRIPTION OF THE PREFERRED EMBODIMENT

Figure 1:
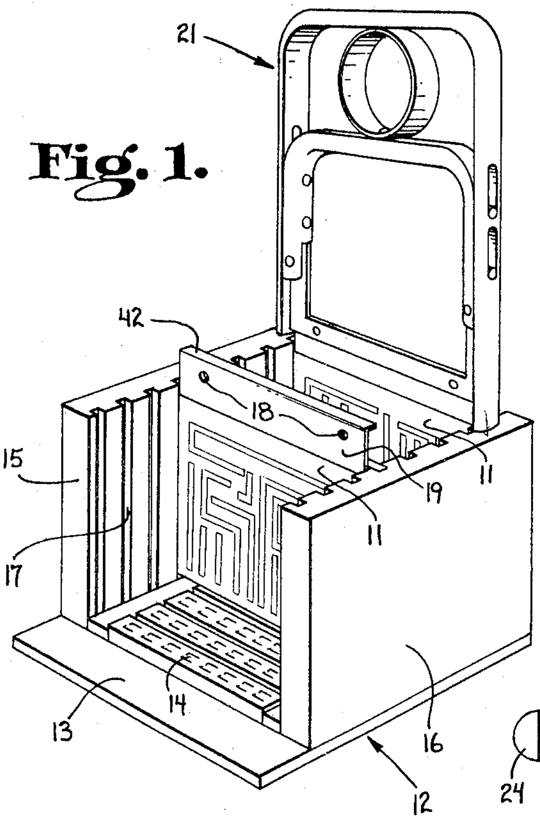
FIGURE 1 is a perspective view showing a module assembly and an extractor for removing a plug-in module.

Referring first to FIGURE 1 of the drawing there is shown, for purposes of illustration, two plug-in modules 11 in a rack or chassis 12. Chassis 12 is shown comprised of a base plate 13 to which a plurality of female connectors 14 are attached. Sides 15 and 16 are attached to base plate 13 and slots 17 are provided in sides 15 and 16 for slidably receiving and supporting plug-in modules 11 which are provided with a male connector which mate with connectors 14. Plug-in modules 11 are provided with a pair of holes 18 in the metallic heat sink 19 and, as hereinafter described, means are provided on extractor 21 for engaging holes 18 for removing modules 11 from chassis 12.

Figure 4:
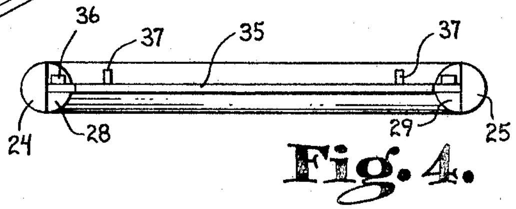
FIGURE 4 is a bottom view of the embodiment shown in FIGURE 1 of the drawing.
Figure 2:
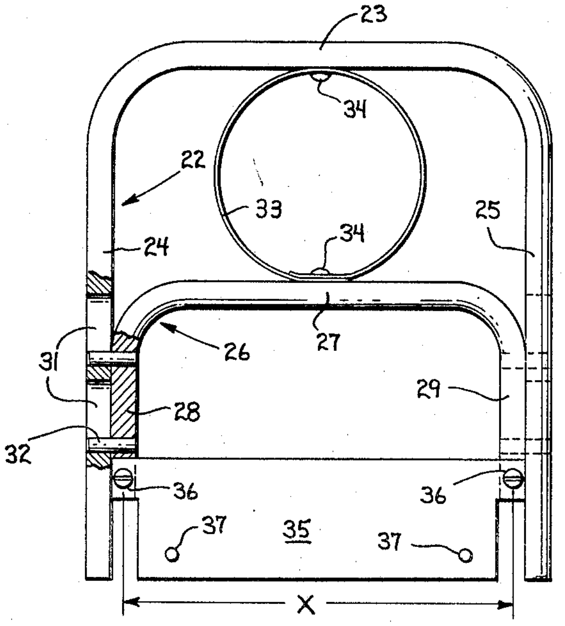
FIGURE 2 is a front view, partially broken away, showing a preferred embodiment of the present invention.
Figure 3:
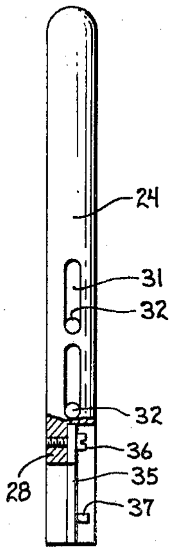
FIGURE 3 is a side view of the embodiment shown in FIGURE 1 of the drawing.

Referring now to FIGURES 2, 3, and 4 of the drawing there is shown a first U-shaped member 22 having a crossbar 23, and parallel legs 24 and 25, and a second U-shaped member 26 having a crossbar 27 and parallel legs 28 and 29. Legs 24 and 25 are provided with a pair of elongated slots 31 and a pair of pins 32 are attached in each leg 28 and 29. Pins 32 extend into and are slidable in slots 31 thereby permitting relative longitudinal movement between U-shaped members 22 and 26 but preventing any sideward movement between the two members. A spring 33 is attached, as by rivets 34, to crossbars 23 and 27, and the force of spring 33 biases U-shaped member 26 so that pins 32 bottoms in slots 31, as shown in FIGURE 2 of the drawing. The bottom ends of legs 28 and 29 are notched, and a puller plate 35 is attached to U-shaped member 26 by screws 36. A pair of pins 37 are attached to puller plate 35 and are adaptable for engaging holes 18 in module 11.

Figure 5:
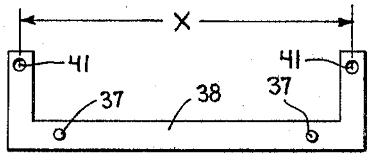
FIGURE 5 is a front view of another embodiment of a puller plate.
Figure 6:
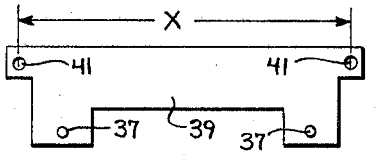
FIGURE 6 is a front view of still another embodiment of a puller plate.

FIGURE 5 shows a puller plate 38 which is of different configuration than puller plate 35 which is shown attached to ejector 21 in FIGURE 2. Likewise, FIGURE 6 shows another configuration of a puller plate 39. Puller plates 38 and 39 are each provided with a pair of holes 41 and the spacing X between holes is such that these puller plates will attach to U-shaped member 26. A pair of pins 37 are also provided on puller plates 38 and 39. By way of examples, different puller plates are provided to accommodate different heat sinks 19. The heat sink 19 which is shown in FIGURE 1 of the drawing is provided with a lip 42 created by a ninety degree bend of heat sink 19 and the U-shaped design of puller plate 38 permits engagement of extractor 21 from either side of heat sink 19. It can be seen, however, that the various puller plates can be readily attached and removed by merely threading or unthreading screws 36 and without affecting the other parts of the extractor.

OPERATION

In operation, assuming a plug-in module 11 is mounted in a chassis 12, an extractor 21 is positioned such that pins 37 engage holes 18 and the ends or bottoms of legs 24 and 25 are positioned on the sides 15 and 16 of chassis 12, as shown in FIGURE 1 of the drawing. Extractor 21 is gripped such that the palm of a hand is against crossbar 23 and two or more fingers engage crossbar 27. Upon squeezing of the fingers engaging crossbar

27, the puller plate attached to legs 28 and 29 moves upwardly toward crossbar 23 while legs 24 and 25 remain stationary. Thus plug-in module 11 is withdrawn from chassis 12 by a controlled force.

Obviously many modifications and variations of the present invention are possible in the light of the above teachings. It is therefore to be understood, that within the scope of the appended claims, the invention may be practiced otherwise than as specifically described.

I claim:

1. A universal extractor tool for removing an electronic module from a chassis comprising:

a first U-shaped member having a crossbar and first and second parallel legs each having at least one elongated slot therein, a second U-shaped member having a crossbar and first and second parallel legs, said second U-shaped member being smaller in width and height than said first U-shaped member, at least one pin attached to each said first and second parallel legs of said second U-shaped member and positioned parallel with said crossbar and extending one each into said elongated slots in said first and second parallel legs of said first U-shaped member whereby said second U-shaped member is slidably attached to said first U-shaped member, spring means positioned between and attached to said crossbars whereby said second U-shaped member is biased outwardly from said first U-shaped member, a puller plate removably attached to said second U-shaped member, and means on said puller plate for attaching said puller plate to an electronic module.

2. A universal extractor tool as set forth in claim 1 wherein said means on said puller plate for attaching said puller plate to an electronic module comprises first and second pins attached to said puller plate and being adaptable for engagement with a pair of holes in said electronic module.

References Cited

UNITED STATES PATENTS 3,180,670 4/1965 Pryde ---------------- 294—15

RICHARD E. AEGERTER, Primary Examiner

D. WATTS, Assistant Examiner